United States Patent [19]

Johnson

[11] 4,431,023
[45] Feb. 14, 1984

[54] PRESSURE RELIEF DEVICE

[75] Inventor: Wendell D. Johnson, Rochester, N.Y.

[73] Assignee: Qualitrol Corporation, Fairport, N.Y.

[21] Appl. No.: 481,257

[22] Filed: Apr. 1, 1983

[51] Int. Cl.³ .................... F16K 17/04; F16K 15/02
[52] U.S. Cl. ................................ 137/316; 137/541; 137/553
[58] Field of Search ............... 137/316, 541, 542, 553

[56] References Cited

U.S. PATENT DOCUMENTS

| | | | |
|---|---|---|---|
| 1,774,690 | 9/1930 | Willoughby | 137/541 |
| 2,592,673 | 4/1952 | Folmsbee | 137/541 |
| 2,599,622 | 6/1952 | Folmsbee | 137/541 |
| 2,643,799 | 6/1953 | Countryman | 137/316 UX |
| 2,886,054 | 5/1959 | Smith et al. | 137/316 |
| 3,008,485 | 11/1961 | Johnson et al. | 137/541 |
| 3,035,604 | 5/1962 | Portis | 137/541 |
| 4,074,696 | 2/1978 | Romanowski | 137/541 |

FOREIGN PATENT DOCUMENTS

| | | | |
|---|---|---|---|
| 1179894 | 5/1959 | France | 137/541 |
| 449581 | 6/1949 | Italy | 137/541 |

*Primary Examiner*—George L. Walton
*Attorney, Agent, or Firm*—Stephen J. Rudy

[57] ABSTRACT

A pressure relief device for use on a liquid filled vessel, such as a power transformer having a coolant oil enclosed, which device includes a clamp arranged on the device so that the pressure relief function of the device is negated until the clamp is removed.

3 Claims, 3 Drawing Figures

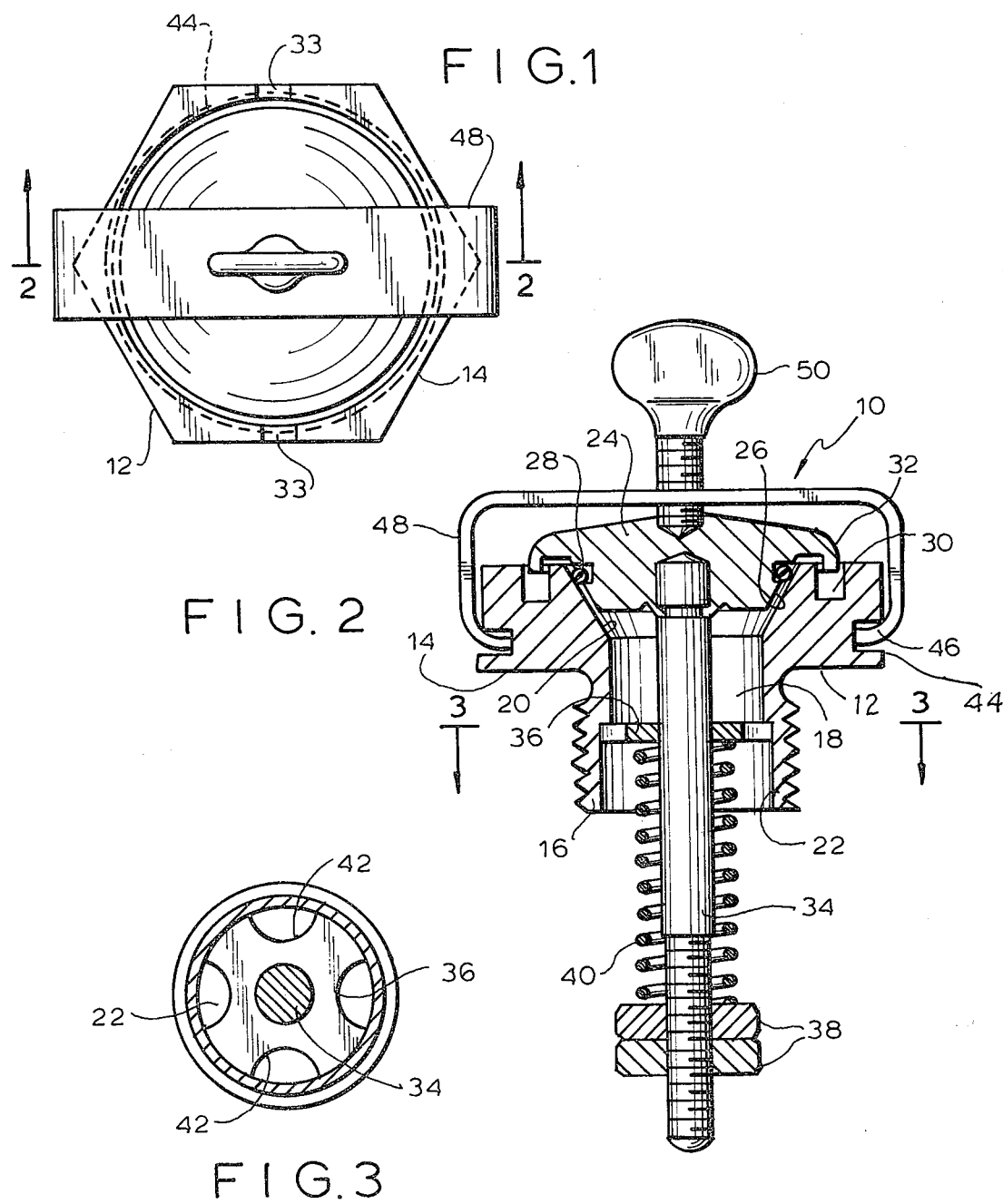

PRESSURE RELIEF DEVICE

This invention relates to a pressure relief device for use on a liquid filled vessel, such as a power transformer having coolant oil enclosed.

Comparable pressure relief devices of the prior art may be opened manually, which is contrary to the purpose of the device, or may be opened inadvertently when mounted upon a vessel being transported, thus allowing the coolant medium to escape.

The pressure relief device of the subject invention avoids the short-comings of the prior art devices as mentioned above. More particularly, it cannot readily be opened manually, or opened inadvertently when mounted upon a vessel being transported. In brief, the pressure relief device of the subject invention is designed to open only when a predetermined pressure is attained in the vessel on which it is mounted.

The main object of this invention is to make a pressure relief device which is difficult to open manually, and which cannot be opened inadvertently when mounted upon a vessel being transported.

It is a further object of this invention to provide a pressure relief device which will open only when a predetermined pressure is attained in the vessel on which it is mounted.

Still another object is to provide a pressure relief device which is of simple structure, of low cost manufacture, and which will provide long and reliable service.

These and further objects and features of the invention will be apparent from the following specification and accompanying drawing wherein:

FIG. 1 is a top view of a pressure relief device embodying the principles of the invention;

FIG. 2 is a section view as seen from line 2—2 in FIG. 1, and;

FIG. 3 is a section view as seen from line 3—3 in FIG. 2.

Referring now to FIG. 2 of the drawing, numeral 10 identifies a pressure relief device of the invention which device includes a valve body 12 having a hexagonal portion 14 and a threaded portion 16 integral therewith. An axial passageway 18 is formed in the valve body 12, the upper region of the passageway having a tapered portion 20, the lower region having an increased diameter portion 22.

A circular valve head 24 has a tapered portion 26 the angle thereof matching that of the angle of the tapered portion 20. An elastomeric "O" ring 28 is supported in the valve head for sealing engagement with the tapered portion 20. A circular groove 30, formed on the upper surface of the valve body 12, is adapted to receive a lip 32 provided on the periphery of the valve head. Since little clearance is provided between the edge of the lip and the groove 30, the valve head would resist manual lifting without use of a special tool. Two drain slots 33 are provided to allow escape of water from the groove 30.

Affixed to the valve head 24 is a stem 34 slidingly supported by a washer 36 mounted in the diameter portion 22. The lower end of the stem 34 is threaded for receipt of nuts 38 which maintain a coil spring 40 in compressive engagement with the washer 36 whereby the valve head 24 is seated. The washer 36 has a plurality of openings 42 so that liquid may flow from the diameter portion 22 to passageway 18, and past the valve head 24 when the latter unseated.

A circular groove 44 is formed about the valve body 12, for receipt of bent portions 46 of a clamp 48. A thumb screw 50, threadly mounted in the clamp 48, engages the valve head 24, so that the latter connot be unseated by medium pressure in the vessel to which the relief device is affixed. The thumb screw and clamp may be painted red, or some other attention getting color, to warn that the clamp should be removed after the relief device is installed. To remove the clamp 48, the thumb screw is unscrewed, and the clamp rotated so that it clears the corners of the hex of the hexagonal portion 14.

It will be apparent that the pressure relief valve disclosed above will satisfy all of the objectives of the invention as set forth hereinbefore.

What is claimed is:

1. A pressure relief device comprising a valve body (12) having a hexagonal portion (14), a valve head (24) having a lip (32) about the periphery of the head, said lip being arranged to enter a groove (30) formed in the valve body, a valve stem (34) affixed to the valve head, a spring (40) compressively arranged to urge the valve head in seated condition to prevent fluid from passing through the valve body, and a clamp (48) arranged to maintain the valve head in seated condition on the valve body, wherein the clamp (48) has bent portions (46) arranged to engage a circular groove (44) formed in the valve body hexagonal portion (14) which allows rotation of the clamp to clear the corners of the hexagonal portion so that the clamp may be removed from the valve body.

2. A pressure relief device according to claim 1, wherein a thumb screw (50) is rotatably mounted in the clamp to engage the valve head (24).

3. A pressure relief device according to claim 2 wherein the clamp (48) and thumb screw (50) are painted in an attention getting color, such as red, for example.

* * * * *